US012804040B2

(12) United States Patent
Shem Tov et al.

(10) Patent No.: US 12,804,040 B2
(45) Date of Patent: Nov. 17, 2026

(54) DE-COUPLING A CLUSTERING NETWORK FOR A STORAGE CLUSTER FROM PHYSICAL INTERFACES

(71) Applicant: Dell Products L.P., Round Rock, TX (US)

(72) Inventors: Marina Shem Tov, Hod Hasharon (IL); Ishay Zekri, Kfar Yona (IL); Vasiliy M. Tolstoy, Dublin (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/895,715

(22) Filed: Sep. 25, 2024

(65) Prior Publication Data

US 2026/0149745 A1 May 28, 2026

(51) Int. Cl.
*H04L 67/1097* (2022.01)
*H04L 67/566* (2022.01)

(52) U.S. Cl.
CPC ........ *H04L 67/1097* (2013.01); *H04L 67/566* (2022.05)

(58) Field of Classification Search
CPC ... H04L 67/10; H04L 67/566; H04L 67/1097; H04L 63/06; H04L 63/0428; H04L 49/101; H04L 49/532; G06F 12/1408
USPC .......................................................... 709/203
See application file for complete search history.

(56) References Cited

U.S. PATENT DOCUMENTS 7,843,906 B1 * 11/2010 Chidambaram .... H04L 49/9094 370/386
7,843,907 B1 * 11/2010 Abou-Emara .......... H04L 49/90 370/386
7,873,693 B1 * 1/2011 Mehrotra ............ H04L 12/4641 710/316
7,953,903 B1 * 5/2011 Finkelstein ......... H04L 12/4641 712/229
7,990,994 B1 * 8/2011 Yeh ..................... H04L 12/4641 711/147
8,090,908 B1 * 1/2012 Bolen ................. H04L 67/1097 711/170
8,145,785 B1 * 3/2012 Finkelstein ........... H04L 49/602 709/224
8,443,066 B1 * 5/2013 Saraiya ................. G06F 13/387 709/239

(Continued)

*Primary Examiner* — James N Fiorillo
(74) *Attorney, Agent, or Firm* — BainwoodHuang

(57) ABSTRACT

Techniques are directed to operating a storage cluster. Such techniques involve providing the storage cluster initially as a single appliance cluster which has a first storage appliance including storage nodes. Such techniques further involve creating clustering devices on the storage nodes of the first storage appliance. The clustering devices are constructed and arranged to form at least a portion of a clustering network to convey cluster-related communications. Additionally, the clustering devices are without bonded physical interfaces at least initially. Such techniques further involve, while the clustering devices are without bonded physical interfaces, running the storage nodes of the first storage appliance to perform storage operations on behalf of a set of hosts. For such a storage cluster, there is high availability from the clustering network perspective and no mandate for hardware-specific IO cards.

18 Claims, 6 Drawing Sheets

(56) References Cited

U.S. PATENT DOCUMENTS

| | | | | |
|---|---|---|---|---|
| 8,484,365 | B1 * | 7/2013 | Pittman | H04L 67/1097<br>709/224 |
| 8,848,727 | B2 * | 9/2014 | Saraiya | H04L 49/70<br>370/428 |
| 8,868,790 | B2 * | 10/2014 | Lovett | H04L 12/4645<br>709/250 |
| 9,301,026 | B2 * | 3/2016 | Srinivas | H04B 10/27 |
| 10,558,586 | B1 * | 2/2020 | Paterra | G06F 12/1408 |
| 10,846,007 | B2 * | 11/2020 | Zhuang | G06F 3/0644 |
| 11,188,564 | B1 * | 11/2021 | Paterra | G06F 3/0617 |
| 2012/0072763 | A1 * | 3/2012 | Lu | G06F 16/183<br>707/704 |
| 2013/0117766 | A1 * | 5/2013 | Bax | G06F 9/4401<br>719/323 |
| 2015/0095788 | A1 * | 4/2015 | Thiele | H04L 41/0897<br>715/735 |
| 2016/0119421 | A1 * | 4/2016 | Semke | H04L 67/1097<br>709/217 |
| 2017/0187547 | A1 * | 6/2017 | Kleingeld-MacKenzie | H04L 67/5682 |
| 2019/0097900 | A1 * | 3/2019 | Rodriguez | G06F 11/1484 |
| 2019/0121737 | A1 * | 4/2019 | Lee | G06F 12/0284 |
| 2020/0028800 | A1 * | 1/2020 | Strathman | H04L 45/245 |
| 2020/0210069 | A1 * | 7/2020 | Singh | G06F 13/4265 |
| 2020/0252344 | A1 * | 8/2020 | Krivenok | G06F 9/45558 |
| 2020/0252351 | A1 * | 8/2020 | Park | H04L 45/18 |
| 2020/0409810 | A1 * | 12/2020 | Wu | G06F 11/079 |
| 2023/0119767 | A1 * | 4/2023 | Pabón | G06F 3/0632<br>714/15 |
| 2025/0030663 | A1 * | 1/2025 | Ding | H04L 63/029 |

* cited by examiner

DE-COUPLING A CLUSTERING NETWORK FOR A STORAGE CLUSTER FROM PHYSICAL INTERFACES

BACKGROUND

A conventional storage cluster processes input/output (IO) requests to store data within and retrieve data from backend storage on behalf of a set of hosts. Such a conventional storage cluster may include storage appliances having storage processors which process the IO requests. In support of such operation, the storage processors also run cluster-related services that communicate over a clustering network (e.g., to exchange cluster-related services communications such as cluster management communications, data migration communications, namespace communications, etc.).

To provide clustering network connectivity between the storage processors of different storage appliances and achieve high availability (HA), the storage processors mandate use of hardware-specific IO cards having multiple physical interfaces. Along these lines, the first two Ethernet ports of the hardware-specific IO cards are cabled to top of rack (ToR) switches of a computer network, and are enslaved (or bonded) to link aggregation groups (LAGs) (also called bonding devices) in accordance with the link aggregation control protocol (LACP).

SUMMARY

Unfortunately, there are deficiencies to the above-described conventional storage cluster which mandates use of hardware-specific IO cards. Along these lines, if there is an overall failure of a hardware-specific IO card and a replacement hardware-specific IO card is unavailable, the cluster-related services running on the storage processors of different storage appliances will be unable to properly exchange cluster-related communications.

Moreover, even if the operator of the conventional storage cluster already has a non-conforming IO card installed (e.g., for host access), the operator cannot use the non-conforming IO card in place of the hardware-specific IO card. Along these lines, the operator might contemplate unbinding the links of the clustering network from a link aggregation group that includes the physical interfaces of a hardware-specific IO card and then binding these links to an existing bond involving the non-conforming IO card. However, such an attempted change would be extremely disruptive to cluster operation. Accordingly, there is a need to remove the requirement of using the hardware-specific IO card and to provide more flexibility for a clustering network through which cluster-related services communicate.

The above need is addressed at least in part by de-coupling a clustering network from physical interfaces. Along these lines, an improved storage cluster may utilize a more flexible clustering network to convey communications among clustering services (e.g., cluster management communications, data migration communications, namespace communications, etc.). To form at least a portion of the clustering network, storage nodes of the storage cluster create clustering devices which are without bonded physical interfaces at least initially. The clustering devices (e.g., link aggregation groups or layer-2 bridges, etc.) may remain de-coupled from physical interfaces and, instead, connect with other bonding devices (e.g., connect with user configured link aggregation groups which bond physical interfaces of hardware-agnostic IO cards) to enable the storage nodes of different storage appliances to exchange the cluster-related communications. Accordingly, for such a storage cluster there is no mandate for hardware-specific IO cards. Moreover, a user (e.g., the operator of the storage cluster) has flexibility to decide which network interface cards (NICs) to use for the clustering network that conveys cluster-related services communications and the storage cluster continues to provide high availability (HA).

One or more embodiments are directed to a method of operating a storage cluster. The method includes providing the storage cluster initially as a single appliance cluster which has a first storage appliance including storage nodes. The method further includes creating clustering devices on the storage nodes of the first storage appliance. The clustering devices are constructed and arranged to form at least a portion of a clustering network to convey cluster-related communications. Additionally, the clustering devices are without bonded physical interfaces at least initially. The method further includes, while the clustering devices are without bonded physical interfaces, running the storage nodes of the first storage appliance to perform storage operations on behalf of a set of hosts.

Additionally, one or more embodiments are directed to data storage equipment which includes memory and control circuitry coupled with the memory. The memory stores instructions which, when carried out by the control circuitry, cause the control circuitry to perform a method of:

(A) configuring the memory and the control circuitry to provide a single appliance cluster which has a first storage appliance including storage nodes, (B) creating clustering devices on the storage nodes of the first storage appliance, the clustering devices being constructed and arranged to form at least a portion of a clustering network to convey cluster-related communications, and the clustering devices being without bonded physical interfaces at least initially, and (C) while the clustering devices are without bonded physical interfaces, running the storage nodes of the first storage appliance to perform storage operations on behalf of a set of hosts.

Furthermore, one or more embodiments are directed to a computer program product having a non-transitory computer readable medium which stores a set of instructions to operate a storage cluster. The set of instructions, when carried out by computerized circuitry, causes the computerized circuitry to perform a method of:

(A) configuring the computerized circuitry to provide a single appliance cluster which has a first storage appliance including storage nodes;

(B) creating clustering devices on the storage nodes of the first storage appliance, the clustering devices being constructed and arranged to form at least a portion of a clustering network to convey cluster-related communications, and the clustering devices being without bonded physical interfaces at least initially; and (C) while the clustering devices are without bonded physical interfaces, running the storage nodes of the first storage appliance to perform storage operations on behalf of a set of hosts.

At any time, IO cards may be added to the storage nodes. When there are IO cards present, host access is available through any ports of any of the IO cards.

In some arrangements, running the storage nodes of the first storage appliance includes conveying clustering network traffic between the storage nodes of the first storage appliance to support clustering services running on the storage nodes of the first storage appliance.

In some arrangements, the first storage appliance further includes an interconnect. Additionally, conveying the clustering network traffic between the storage nodes of the first storage appliance includes exchanging intra-appliance communications through the interconnect.

In some arrangements, conveying the clustering network traffic between the storage nodes of the first storage appliance occurs while the first storage appliance does not include any network cards and while there are no physical Ethernet ports connected to the clustering devices.

In some arrangements, creating the clustering devices on the storage nodes of the first storage appliance includes creating the clustering devices as link aggregation groups, the created clustering devices having no enslaved physical interfaces.

In some arrangements, running the storage nodes of the first storage appliance to perform the storage operations on behalf of the set of hosts occurs while the created clustering devices have no enslaved physical interfaces.

In some arrangements, the method further includes (i) installing network cards onto the storage nodes of the first storage appliance, the network cards having physical interfaces, (ii) creating user bond devices which enslave the physical interfaces of network cards, and (iii) coupling the user bond devices with the clustering devices.

In some arrangements, the network cards are hardware-agnostic network interface cards (NICs). Additionally, coupling the user bond devices with the cluster bond devices includes enslaving the user bond devices with the cluster bond devices.

In some arrangements, the method further includes conveying host communications to and from the set of hosts through the physical interfaces of the network cards.

In some arrangements, the method further includes establishing connections between the first storage appliance and a second storage appliance through the clustering devices, the user bond devices, and the physical interfaces of the network cards to form a multi-appliance cluster in place of the single appliance cluster.

It should be understood that, in the cloud context, at least some of the electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in de-coupling a clustering network for a storage cluster from physical interfaces.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to de-coupling a clustering network from physical interfaces. Along these lines, a storage cluster may utilize a clustering network to convey communications among clustering services (e.g., cluster management communications, data migration communications, namespace communications, etc.). To form at least a portion of the clustering network, storage nodes of the storage cluster create clustering devices which are without bonded physical interfaces at least initially. The clustering devices (e.g., link aggregation groups or layer-2 bridges, etc.) may remain de-coupled from physical interfaces and, instead, connect with other bonding devices (e.g., connect with user configured link aggregation groups which bond physical interfaces of hardware-agnostic IO cards) to enable the storage nodes of different storage appliances to exchange the cluster-related communications. Accordingly, for such a storage cluster there is no mandate for hardware-specific IO cards. Moreover, a user (e.g., the operator of the storage cluster) has flexibility to decide which network interface cards (NICs) to use for the clustering network that conveys cluster-related services communications and the storage cluster continues to provide high availability (HA).

Figure 1A:
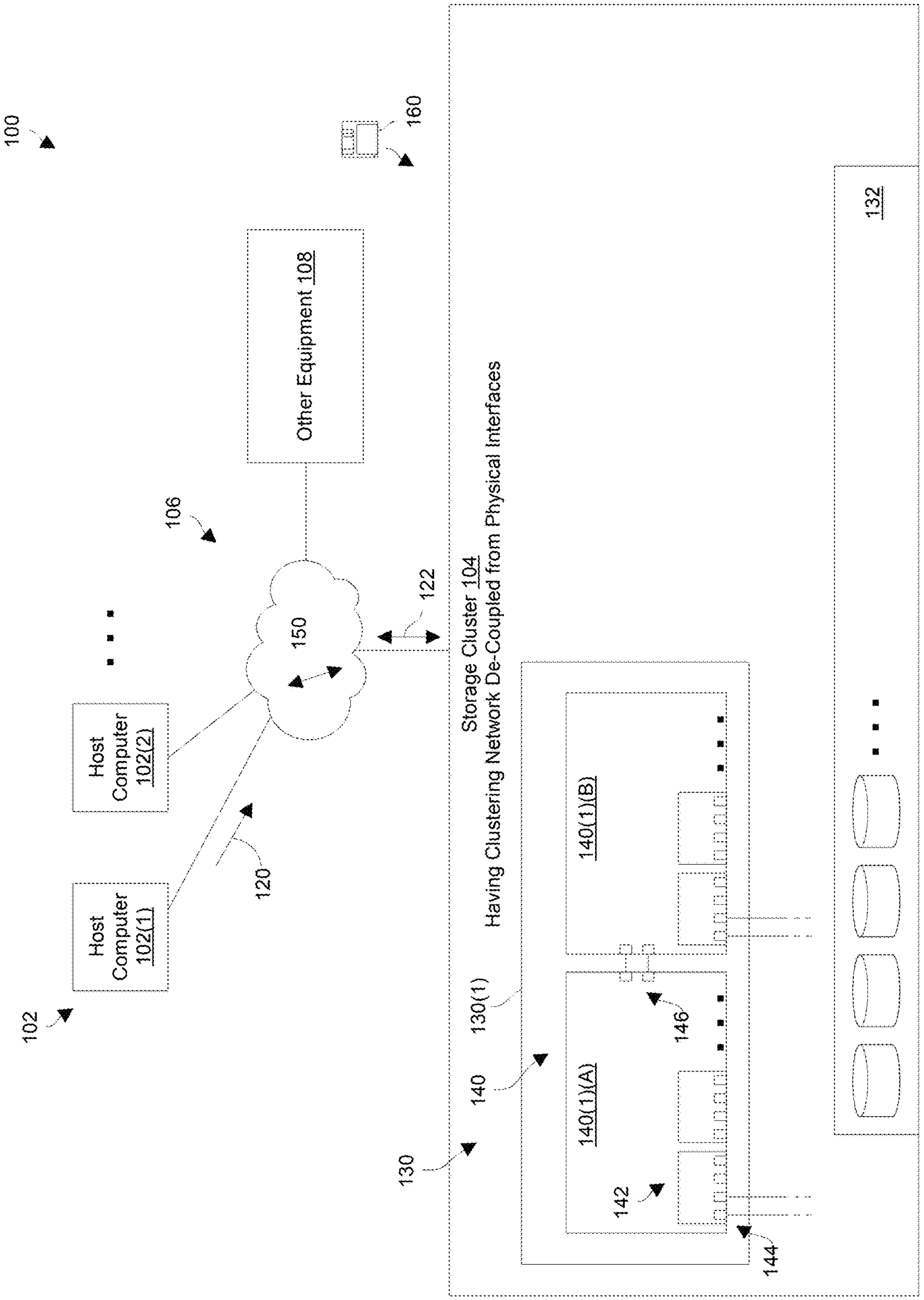
FIG. 1A is a block diagram of a storage cluster environment in a single appliance cluster arrangement in which there is de-coupling of a clustering network from physical interfaces in accordance with certain embodiments.
Figure 1B:
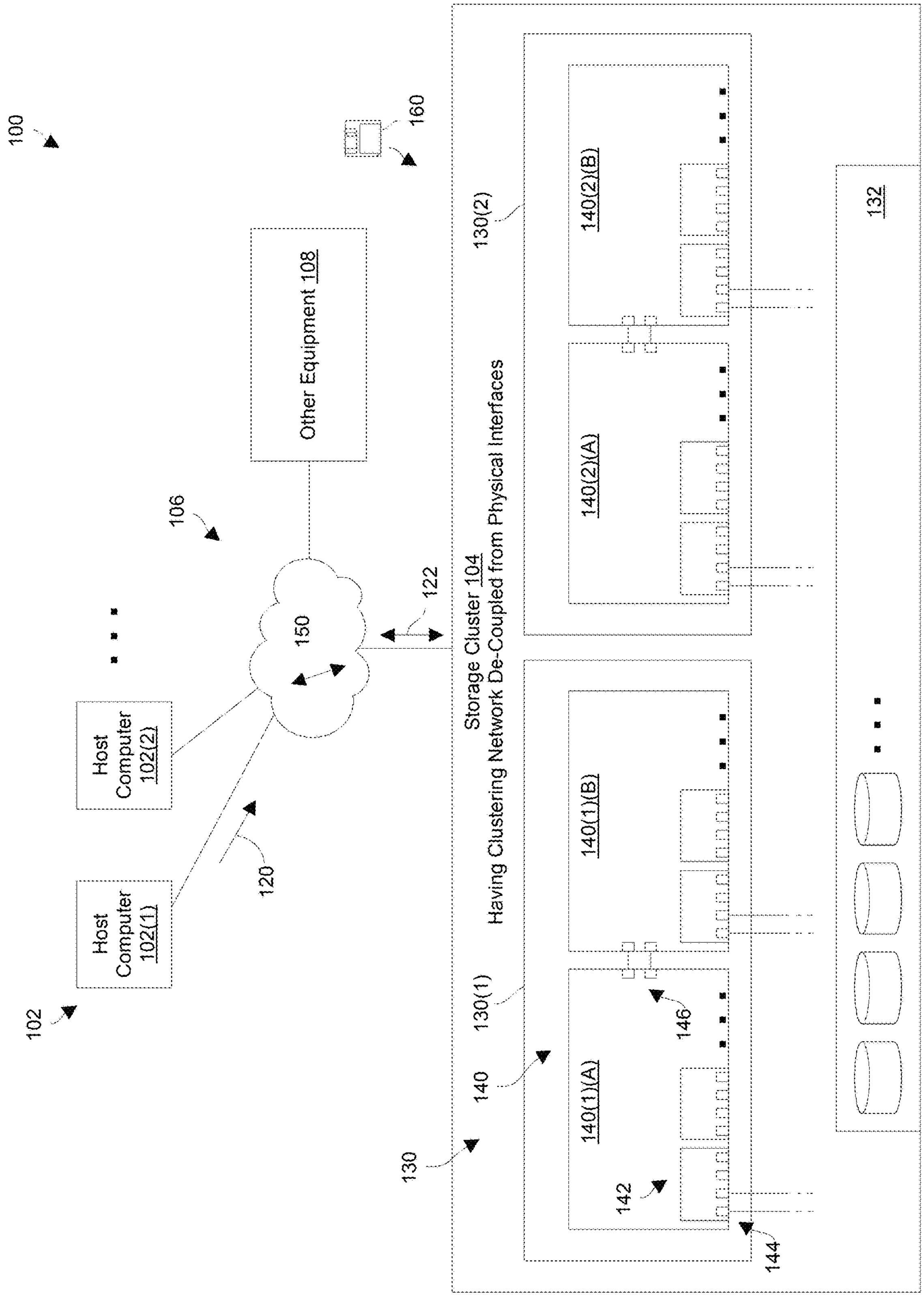
FIG. 1B is a block diagram of the storage cluster environment in a multi-appliance cluster arrangement in which there is still de-coupling of the clustering network from physical interfaces in accordance with certain embodiments.

FIGS. 1A and 1B show a storage cluster environment 100 in which there is de-coupling of a clustering network from physical interfaces in accordance with certain embodiments. FIG. 1A shows the storage cluster environment 100 in a single appliance cluster arrangement in accordance with certain embodiments. FIG. 1B shows the storage cluster environment in a multi-appliance cluster arrangement in accordance with certain embodiments.

As shown in FIGS. 1A and 1B, the storage cluster environment 100 includes host computers 102(1), 102(2), . . . (collectively, host computers 102), a storage cluster 104, a communications medium 106, and perhaps other equipment 108.

The host computers 102 are constructed and arranged to perform useful work. For example, one or more of the host computers 102 may operate as a file server, a web server, an email server, an enterprise server, a database server, a transaction server, combinations thereof, etc. which provides input/output (IO) requests 120 to the storage cluster 104. In this context, the host computers 102 may provide a variety of different IO requests 120 (e.g., block and/or file based write commands, block and/or file based read commands, combinations thereof, etc.) that direct the storage cluster 104 to store data 122 within and/or retrieve data 122 from storage (e.g., primary storage or main memory, secondary storage, tiered storage, combinations thereof, etc.).

The storage cluster 104 is an example of data storage equipment which de-couples a clustering network from physical interfaces. The storage cluster 104 includes at least one storage appliance 130 and a set of storage devices 132. By way of example, the storage cluster 104 is shown as initially including one storage appliance 130 in FIG. 1A, and later including two storage appliances 130 in FIG. 1B. However, it should be understood that the storage cluster 104 may include a different number of storage appliances 130 (e.g., three, four, etc.). Moreover, the storage appliances 130 do not need to be co-located but instead may be separated by large distances (e.g., may reside in different rooms, in different buildings, on different campuses, in different states, etc.).

As just mentioned and along the lines of an example expansion path, the storage cluster 104 initially includes just one storage appliance 130 (e.g., the storage appliance 130(1)) thus forming a single appliance cluster (e.g., see FIG. 1A). Then, over time, at least one more storage appliance 130 (e.g., the storage appliance 130(2)) is added to form a multi-appliance cluster (e.g., see FIG. 1B). Such expansion (or scaling-out) may occur after the storage cluster 104 has operated as a single appliance cluster for an extended period of time.

As further shown, the storage appliances 130 include storage nodes 140. Along these lines, the storage appliance 130(1) includes storage nodes 140(1)(A), 140(1)(B). Similarly, the storage appliance 130(2) includes storage nodes 140(2)(A), 140(2)(B).

The storage nodes 140 may include network interface cards (NICs) 142 having physical interfaces (also called ports) 144 to connect to a computer network. Along these lines, the ports 144 may be physical Ethernet ports that individually cable to data communications devices of the communications medium 106, e.g., to top of rack (ToR) switches. In some arrangements, the NICs 142 have multiple ports 144 for fault tolerance (e.g., for redundancy in the event of a port failure).

The storage nodes 140 are constructed and arranged to respond to the IO requests 120 received from the host computers 102 by writing data into the set of storage devices 132 and/or reading the data from the storage devices 132. Along these lines, the storage nodes 140 operate as storage processing modules or storage processors (SPs), engines, data movers, director boards, blades, etc. In addition to the NICs 142, the storage nodes 140 may include a variety of other specialized subcomponents such as processing circuitry to process the IO requests 120 from the host computers 102, cache memory to operate as read and/or write caches, LEDs, and so on.

The set of storage devices 132 (e.g., an array or storage devices 132) is constructed and arranged to store data within the storage cluster 104. In accordance with certain embodiments, the storage devices 132 may arrange the data in accordance with one or more data protection schemes (e.g., RAID1, RAID5, RAID6, RAID10, etc.). Example storage devices 132 include RAM devices, NVRAM devices, other solid state memory devices (SSDs), hard disk drives (HDDs), combinations thereof, and so on.

It should be understood that the storage cluster 104 may include additional componentry to support operation of the storage appliances 130. To this end, such componentry may include housings/enclosures to protect the storage nodes 140 against damage/tampering/etc. and to control airflow, power converters to provide electric power, fans to remove heat, sensors, expansion hardware, and so on.

As shown by the features connecting together the storage nodes 140 of the same storage appliances 130, the storage appliances 130 include interconnects 146 (e.g., one or more midplanes and/or backplanes) for intra-node communications. Such interconnects 146 enable the storage nodes 140 of the same storage appliance 130 to communicate without sending such communications through the NICs 142.

The communications medium 106 is constructed and arranged to connect the various components of the storage cluster environment 100 together to enable these components to exchange electronic signals 150 (e.g., see the double arrow 150). At least a portion of the communications medium 106 is illustrated as a cloud to indicate that the communications medium 106 is capable of having a variety of different topologies including backbone, hub and spoke, loop, irregular, combinations thereof, and so on. Along these lines, the communications medium 106 may include copper based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other equipment 108 represents other possible componentry of the storage cluster environment 100. Along these lines, the other equipment 108 may include remote data storage equipment that provides data to and/or receives data from the storage cluster 104 (e.g., replication arrays, backup and/or archiving equipment, external service processors and/or other management/control devices, etc.).

During operation, the storage cluster 104 processes IO requests 120 from the set of host computers 102 to perform useful work. In particular, the storage nodes 140 write host data 122 into and retrieve host data 122 from the set of storage devices 132 in response to the IO requests 120. Such operation enjoys fault tolerance at a variety of different levels to maintain high availability (HA) in the event of a failure (e.g., redundant storage appliances 130, redundant storage nodes 140 within the storage appliances 130, redundant NICs 142 within the storage nodes 140, redundant ports 144 within the NICs 142, etc.).

During such operation, it should be understood that the storage nodes 140 operate as a federated storage system that forms and maintains a separate clustering network which conveys communications among cluster-related services running on the storage nodes 140. Such a separate clustering network may include portions of the storage cluster 104 (e.g., the NICs 142, the interconnects 146, etc.) as well as external network componentry (e.g., ToR switches, other data communications devices of the communications medium 106, etc.).

Along these lines, the storage nodes 140 may form an internal cluster management (ICM) network which can be used for internal storage cluster communications such as control plane communications (e.g., remote command execution), cluster database access (e.g., for cluster persistence), file server communications (e.g., via software defined NAS or SDNAS), and the like. Additionally, the storage nodes 140 may form an internal cluster data (ICD) network for data mobility traffic between storage appliances 130 (e.g., volume migration between storage appliances 130). Furthermore, the storage nodes 140 may exchange NAS management communications, as well as other communications for cluster-related services which may be transparent to the user, in the background, etc.

However, in contrast to a conventional storage system which mandates use of hardware-specific IO cards and tightly couples the ports of the hardware-specific IO cards to the clustering network, the storage nodes 140 of the storage cluster 104 are able to de-couple the clustering network from physical interfaces. Along these lines, the storage nodes 140 create clustering devices which have no enslaved interfaces. Rather, such clustering devices (e.g., ling aggregation groups, layer-2 bridges, etc.) enable coupling of user bond devices which may bond (or enslave) physical interfaces of network cards.

Such an arrangement enables the clustering devices to remain flexible (e.g., by coupling with the physical interfaces indirectly through the user bond devices) but nevertheless provide connectivity for high availability (HA). Moreover, with such an arrangement, there is no mandate for any hardware-specific IO card. Instead, the storage nodes 140 may use hardware-agnostic IO cards (e.g., generic NICs which are further used by the users for host IO communications).

Although the focus on the storage nodes 140 has been on their ability to de-couple their respective portions of the clustering network from the ports 144 of the NICs 142, it should be appreciated that storage cluster 104 enjoys robust and reliable high availability (HA). Along these lines, the storage cluster 104 includes multiple storage appliances 130. Additionally, the storage appliances 130 include multiple storage nodes 140. Furthermore, the storage nodes 140 include multiple NICs 142. Also, the NICs 142 include multiple physical ports 144 which connect with the communication medium 106. Such redundancy removes susceptibility to a single point of failure.

It should be further appreciated that the storage nodes 140 further include other componentry such as memory and processing circuitry. In some embodiments, the memory and processing circuitry reside together as an integrated assembly (e.g., within the same housing in adjacent slots, on the same printed circuit board, etc.).

The memory of a storage node 140 may take the form of volatile storage (e.g., DRAM, SRAM, etc.) and/or non-volatile storage (e.g., flash memory, magnetic memory, etc.). Along these lines, the memory is constructed and arranged to store a variety of software constructs including specialized code, specialized data structures, and other applications and data. The specialized code is intended to refer to operating system and control instructions such as a kernel to manage computerized resources (e.g., processor cycles, memory space, etc.), drivers (e.g., an IO stack), and so on. The specialized data structures includes objects, files, etc. as well as other data structures (e.g., metadata, configuration information, etc.). The other applications and data include applications and routines to provide background services, user-level applications, administrative tools, utilities, and so on.

The processing circuitry of a storage node 140 is constructed and arranged to operate in accordance with the various software constructs stored in the memory. As will be explained in further detail shortly, the processing circuitry executes the specialized code to form specialized circuitry which is able to de-couple the clustering network from physical interfaces. Such specialized circuitry may be augmented or further implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 160 is capable of delivering all or portions of the software constructs to the processing circuitry. In particular, the computer program product 160 has a non-transitory (or non-volatile) computer readable medium which stores a set of instructions which controls one or more operations of the processing circuitry. Examples of suitable computer readable storage media include tangible articles of manufacture and apparatus which store instructions in a non-volatile manner such as CD-ROM, flash memory, disk memory, tape memory, and the like. Further details will now be provided with reference to FIG. 2.

Figure 2:
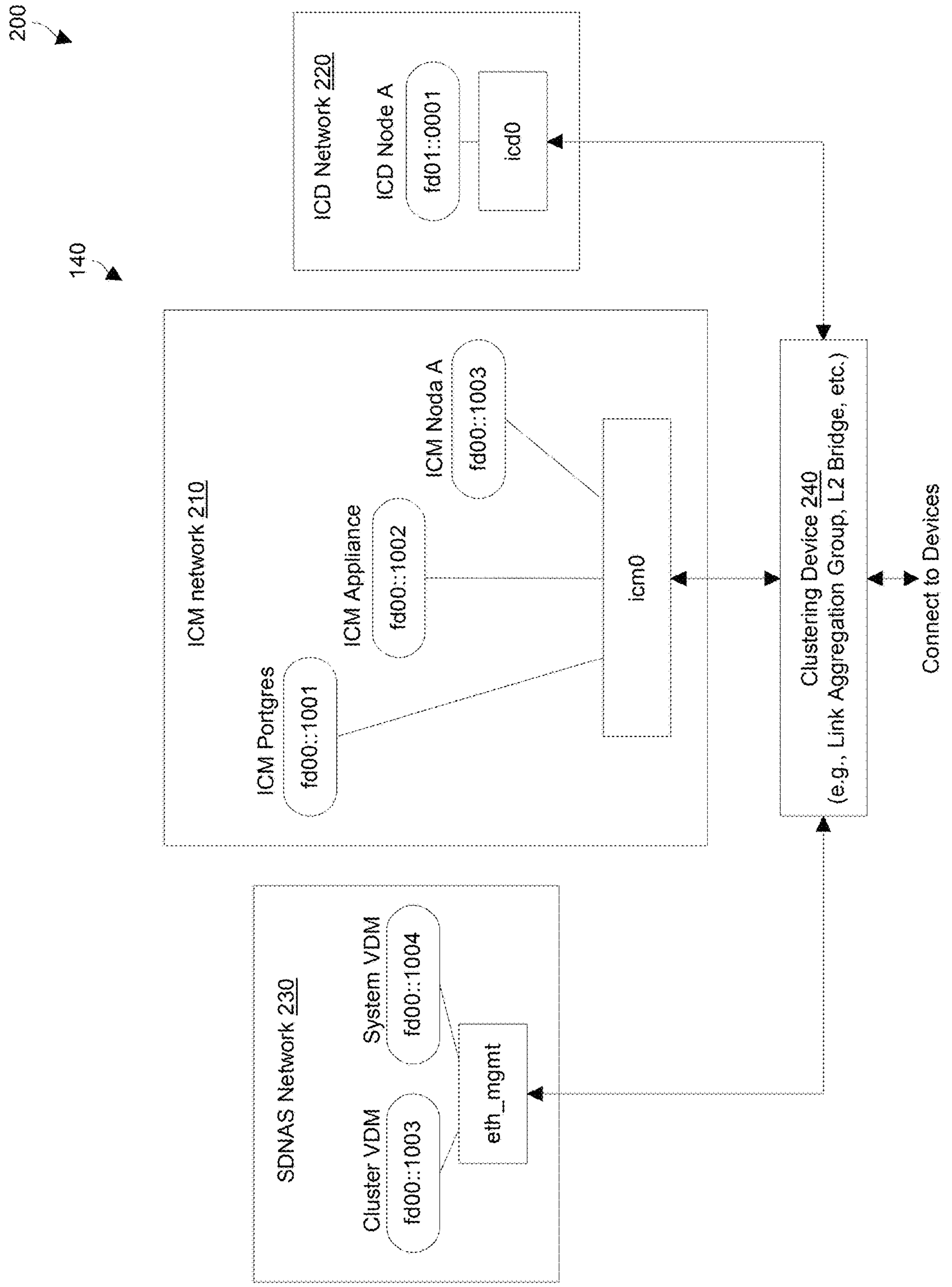
FIG. 2 is a block diagram of certain details of a storage node of a storage appliance in accordance with certain embodiments.

FIG. 2 shows a portion of a clustering network 200 which is formed and maintained within a storage node 140 of a storage appliance 130 (also see FIGS. 1A and 1B) in accordance with certain embodiments. As shown and by way of example only, the portion of the clustering network 200 includes an ICM network 210, an ICD network 220, an SDNAS network 230, and a clustering device 240.

The ICM network 210 includes one or more individually addressable entities (or services) which may send messages to and receive messages from other addressable entities on the clustering network 200 (e.g., to/from entities on the same storage node 140, entities on another storage node 140 of the same storage appliance 130, entities on another storage appliance 130, etc.). As mentioned earlier, such storage cluster communications may include control plane communications (e.g., remote command execution), cluster database access communications (e.g., for cluster persistence), file server communications (e.g., via software defined NAS or SDNAS), and so on. By way of example only and as shown in FIG. 2, the storage node 140 includes the following ICM services: ICM portgres, ICM appliance, and ICM node A.

The ICD network 220 similarly includes one or more addressable entities which may send messages to and receive messages from other addressable entities on the clustering network 200. As mentioned earlier, such storage cluster communications may include data mobility traffic such as messages containing data during volume migration between storage appliances 130. By way of example only and as shown in FIG. 2, the storage node 140 includes the following ICM service: ICD node A.

The SDNAS network 230 similarly includes one or more addressable entities which may send messages to and receive messages from other addressable entities on the clustering network 200. As mentioned earlier, such storage cluster communications may include NAS management communications and other SDNAS-related communications. By way of example only and as shown in FIG. 2, the storage node 140 includes the following SDNAS services: cluster VDM and system VDM.

In accordance with certain embodiments, such cluster-related entities/services use auto-generated IPv6 Unique Local Addresses (ULA). However, in other embodiments, other types, formats, and/or protocols for addresses are suitable for use as well (e.g., global IPv6, IPv4, etc.).

The clustering device 240 is an internal clustering network device created by the storage node 140 such as a link aggregation group (LAG). The clustering device 240 serves as a root device on which an L3 (layer-3) network may reside. Accordingly, the clustering device 240 does not require tight coupling with a specific (or default) IO card. Rather, the clustering device 240 enables de-coupling of the L3 network from the L2 (layer-2) physical network, and a user may create/choose any bond (e.g., a bond which includes physical ports of a hardware-agnostic IO card) to enslave it to the clustering device 240. As a result, there is flexibility and no requirement to use a hardware-specific IO card to support the clustering network.

In some embodiments, a bridge is used in place of a LAG. Such a L2 bridge (e.g., a shim internal device) serves the same function as a LAG, and similarly allows flexibility and does not impose a requirement to use a hardware-specific IO card to support the clustering network.

Regardless of whether the clustering device 240 is a LAG or an L2 bridge, the ability exists to move the whole hierarchy tree (e.g., see FIG. 2) together with the devices in multiple containers. Further details will now be provided with reference to FIG. 3.

Figure 3:
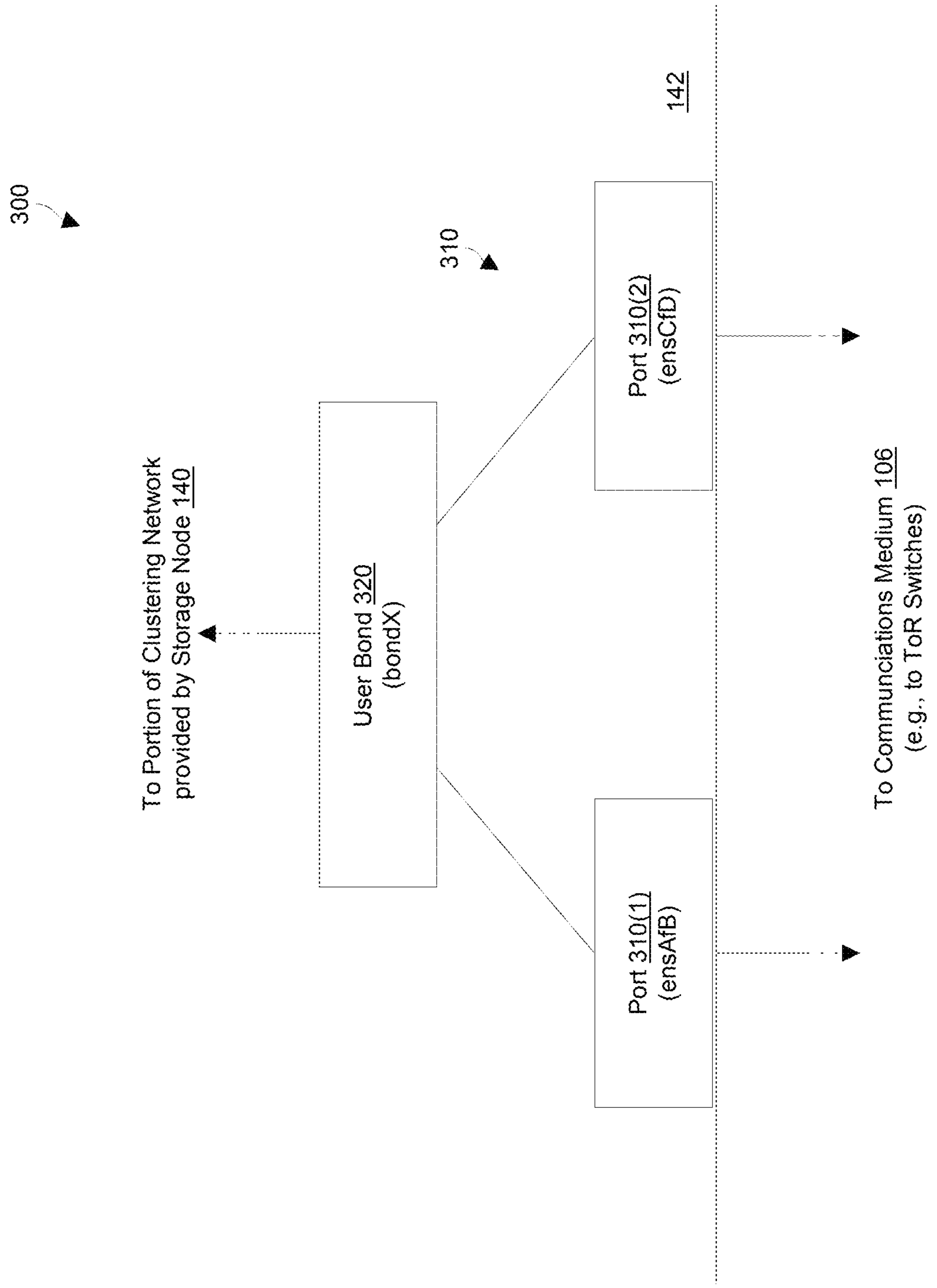
FIG. 3 is a block diagram of certain details of a network interface card for a storage node in accordance with certain embodiments.

FIG. 3 is a view 300 showing certain details for a NIC 142 for a storage node 140 in accordance with certain embodiments. The NIC 142 includes ports (or interfaces) 310 which are constructed and arranged to connect with the communications medium 106 (also see FIGS. 1A and 1B). Along these lines, the ports 310 may be physical Ethernet ports which individually cable to TOR switches which form part of a larger computer network (e.g., see the communications medium 106 in FIGS. 1A and 1B).

For redundancy (fault tolerance) and by way of example, the NIC 142 includes two ports 310(1), 310(2). However, it should be understood that the NIC 142 may include more than two ports 310 (e.g., three, four, etc.).

In accordance with certain embodiments, the NIC 142 is hardware-agnostic and configurable by the user (e.g., the operator/administrator of the storage cluster 104 (FIGS. 1A and 1B). Along these lines, the user is able to configure a user bond 320 (e.g., named "bondX") which enslaves the ports 310(1), 310(2) (named "ensAfB" and "ensCfD"). As will be explained in further detail shortly, the user bond 320 enables a clustering device 240 (also see FIG. 2) to access the ports 310 of the NIC 142. However, such access is dynamic/flexible in the sense that the portion of the clustering network 200 provided by the storage node 140 (e.g., the devices, IPs, etc.) sit on top of the clustering device 240 and remain intact and can be seamlessly switched between different external connection bonds and VLANs. That is, the user is able to non-disruptively switch the clustering network of the storage node 140 to use different ports, to different VLANs, completely disconnect it from the external network infrastructure, etc. Further details will now be provided with reference to FIG. 4.

Figure 4:
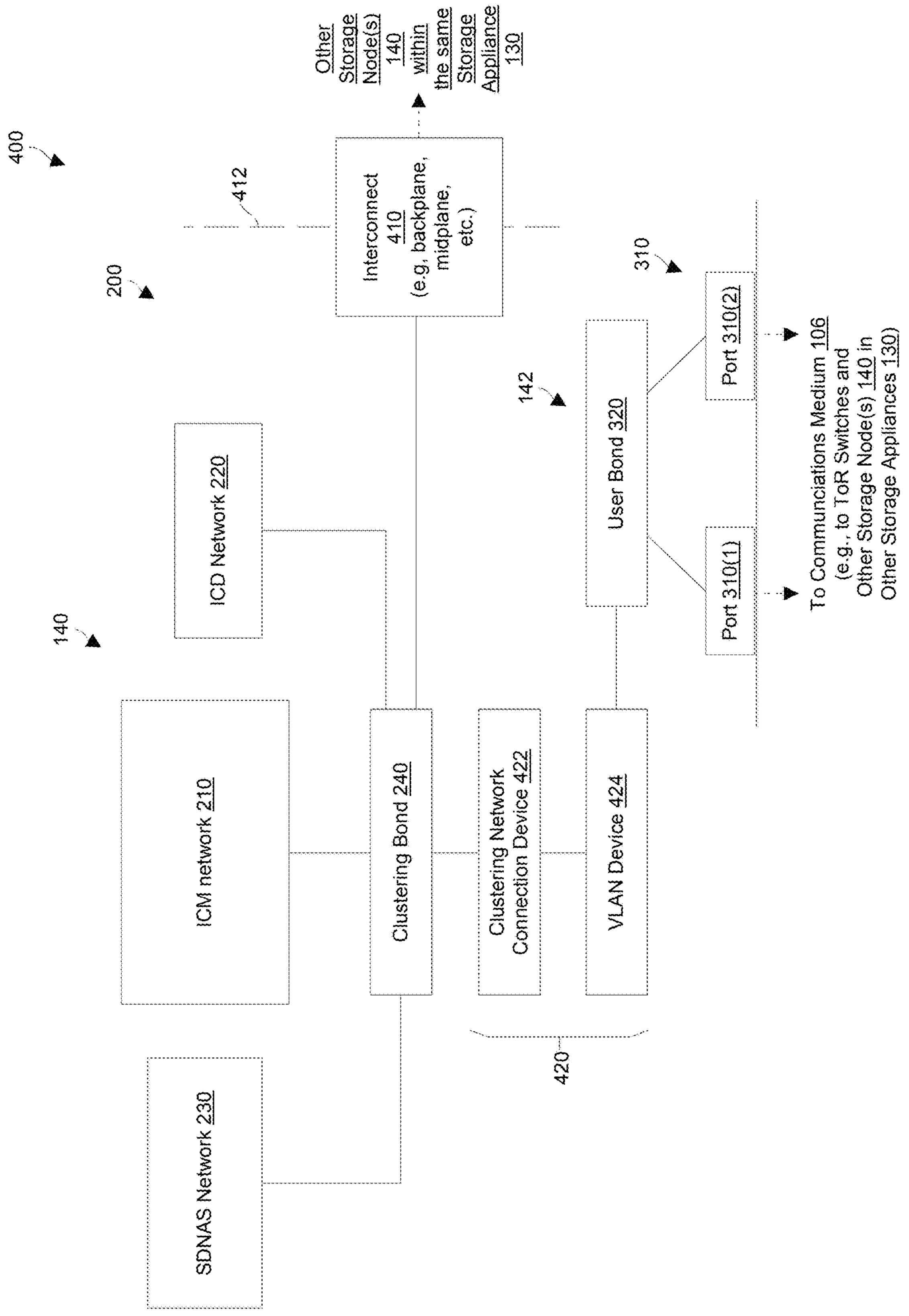
FIG. 4 is a block diagram of certain details of the storage node connecting with the network interface card in accordance with certain embodiments.

FIG. 4 is a view 400 showing certain details of a storage node 140 which connects with an interconnect 410 and a NIC 142. Example interconnects 410 include midplanes, backplanes, combinations thereof, etc. Additionally, although the storage node 140 is shown connected to one NIC 142, it should be understood that the storage node 140 is able to similarly connect with more than one NIC 142 at the same time (e.g., also see FIGS. 1A and 1B).

With the storage node 140 connected to the interconnect 410, the storage node 140 is able to communicate with one or more other storage nodes 140 within the same storage appliance 130. The dashed line 412 delineates the portion of clustering network 200 which resides on the storage nodes 140 (FIG. 2) from one or more other portions of the clustering network 200 which resides on one or more other storage nodes 140. For example, such storage nodes 140 may reside within the same rack enclosure, frame, housing, chassis, cabinet, etc. which further supports the interconnect 410 (e.g., see FIGS. 1A and 1B).

Additionally, with the storage node 140 connected to the NIC 142, the storage node 140 is able to communicate with one or more other storage nodes 140 within one or more other storage appliances 130. For example, the ports 310 of the NIC 142 may individually cable to TOR switches of the communications medium 106 and then to NICs 142 of other storage nodes 140 of other storage appliances 130.

To enable communications between the storage nodes 140 of different storage appliances 130, the clustering device 240 of the storage node 140 couples with the user bond 320 which enslaves ports 310 of the NIC 142. Such coupling may be direct (e.g., with the clustering device 240 coupling directly with the user bond 320. Alternatively, such coupling may be indirect via other devices 420 such as a clustering network connection device 422 and a VLAN device 424 (e.g., via bonding, enslaving, etc.). Further details will now be provided with reference to FIG. 5.

Figure 5:
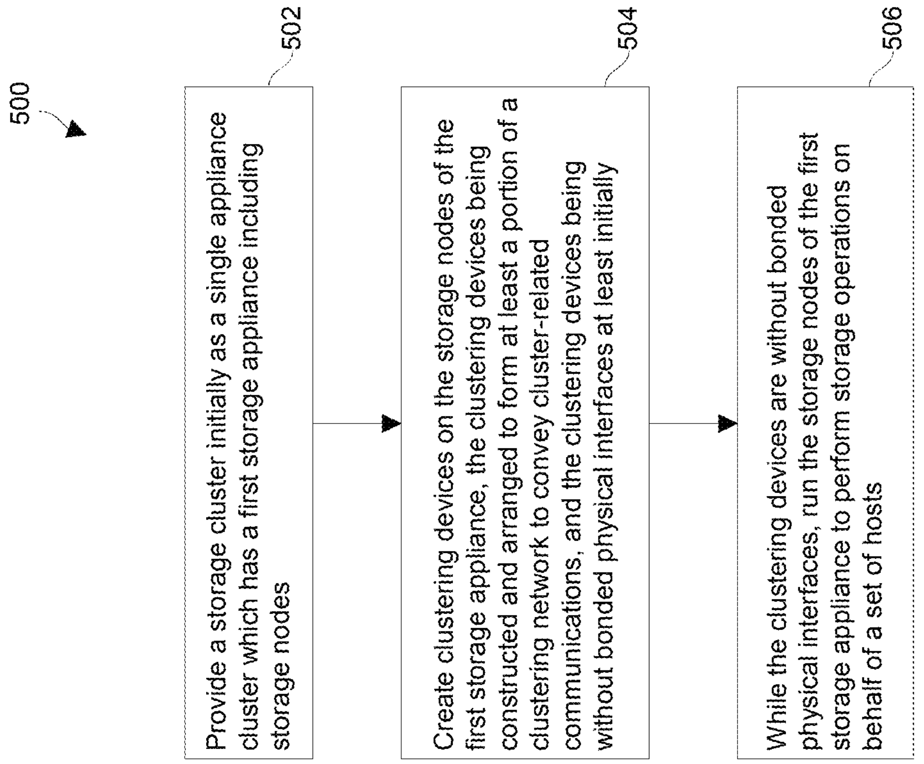
FIG. 5 is a flowchart of a procedure to operate a storage cluster with de-coupling of a clustering network from physical interfaces in accordance with certain embodiments.

FIG. 5 is a flowchart of a procedure 500 to operate a storage cluster with de-coupling of a clustering network from physical interfaces in accordance with certain embodiments. Such a procedure 500 alleviates any requirement to use hardware-specific IO cards and, instead, offers great flexibility (e.g., a user can configure hardware-agnostic IO cards which may be available for other reasons such as host connectivity).

At 502, a storage cluster is provided initially as a single appliance cluster which has a first storage appliance including storage nodes. Although the storage nodes may be equipped with NICs (e.g., also see the storage appliance 130(1) in FIGS. 1A and 1B), the storage nodes do not need any IO cards at this time (e.g., host connectivity may be achieved through SAN hardware/fabric).

At 504, clustering devices are created on the storage nodes of the first storage appliance, the clustering devices being constructed and arranged to form at least a portion of a clustering network to convey cluster-related communications. Additionally, the clustering devices are without bonded physical interfaces (or ports) at least initially. In some arrangements, the clustering devices are LAGs which enable coupling with other bond devices (e.g., enslaving the other bond devices to the clustering devices). In other arrangements, the clustering devices are L2 bridges (e.g., shim devices within the IO stack) which serve the same general function as the LAGs.

At 506, while the clustering devices are without bonded physical interfaces, the storage nodes of the first storage appliance run (or operate) to perform storage operations on behalf of a set of hosts (e.g., see the host computers 102 in FIGS. 1A and 1B). Along these lines, the storage nodes perform data storage operations (e.g., store data into and retrieve data from storage devices) and the clustering devices that were created place the storage cluster in a state in which the storage cluster is ready for expansion/scale-out without any hardware-specific IO card requirement.

As described above, improved techniques are directed to de-coupling a clustering network from physical interfaces. Along these lines, a storage cluster 104 may utilize a clustering network to convey communications among clustering services (e.g., cluster management communications, data migration communications, namespace communications, etc.). To form at least a portion of the clustering network, storage nodes 140 of the storage cluster 104 create clustering devices 240 which are without bonded physical interfaces at least initially. The clustering devices 240 (e.g., LAGs or L2 bridges, etc.) may remain de-coupled from physical interfaces and, instead, connect with other bonding devices (e.g., connect with user configured LAGs which bond physical interfaces of hardware-agnostic IO cards) to enable the storage nodes 140 of different storage appliances 130 to exchange the cluster-related communications.

Accordingly, for such a storage cluster 104 there is no mandate for hardware-specific IO cards. Moreover, a user (e.g., an operator of the storage cluster 104) has flexibility to decide which NICs 142 to use for the clustering network that conveys cluster-related services communications and the storage cluster 104 continues to provide high availability (HA).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the storage cluster environment 100 such as the host computers 102 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that the term "hardware-agnostic" IO cards means that the storage nodes do not need to use specific IO cards (or NICs) that rely on a particular architecture, that are provided by a particular manufacturer, etc. Rather, the storage nodes may use any IO card (or NIC) for clustering. On the other hand, the term "hardware-specific" refers to IO cards with particular circuitry/architecture in order for conventional storage nodes to operate properly.

It should be appreciated that an existing approach to providing high availability to a data storage cluster involves tightly coupling the clustering network which is used by cluster services to specific hardware and IO cards. Along these lines, the storage processors mandate existence of a hardware-specific IO card and a pre-configured bond interface for connectivity between appliances. Additionally, the clustering network is managed internally and the user has no control over which IO card and ports within the IO card can be used for the clustering network. Such tightly coupling with the hardware-specific IO card must exist before the data storage cluster can be expanded beyond a single appliance.

Nevertheless, some customer installs may wish to scale-out the data storage cluster to a federation of multiple appliances. Along these lines, the appliances would include multiple storage processors (or computing servers) with shared back-end drives and which run storage stacks that communicate over the network (e.g., where the appliances have their own captive storage (volumes) which cannot be accessed from any other appliance).

For example, the network may include an internal cluster management (ICM) network which is used for all use cases of internal communication within the cluster, e.g.:

- Communication between Control Plains (CP) of the appliances—e.g., remote commands execution,
- Access to cluster DB or other cluster persistence mechanism, and
- Communication with SDNAS (File Server) container.

The network may further include an internal cluster data (ICD) network which is used for data mobility traffic between the appliances (e.g., volume migration between appliances). Also, the network may include NAS management (part of ICM network).

However, in a traditional approach, physical connectivity between the appliances is based on existence of a default (or hardware-specific) IO card, which must be installed for deployment of a multi-appliance cluster. Here, the ICM and ICD networks runs over predefined LACP bond (referred as a system bond), which is configured on top of the first two Ethernet ports of the default IO card. This system bond is a LACP/LAG which is created/configured by default upon installation time and cannot be deleted or modified by the user. The two ports of the default IO card are cabled to a ToR switch for communication with other appliances of the data storage cluster.

Intra-appliance communications may still occur over interconnect links between the storage processors within the appliances. Along these lines, clustering network traffic is routed through the interconnect links rather than the external connections through the system bond.

Unfortunately, this conventional approach is restrictive. For example, the above-described implementation is created at installation time by the system and is not controlled by the user. Moreover, the implementation uses only a specific default IO card (e.g., an OCP Mezz card) for connectivity between appliances via external switches. Although on some platforms it may be possible to deploy a single appliance cluster without this specific default IO card, to scale out to multi-appliance cluster it is mandatory to install this specific default IO card.

It is worthy to note that the LACP/LAG which is referred as system bond is created at installation time on specific predefined IO card ports of default IO card. Such a system bond is created at installation time even if default IO card is not installed. In this case, the system bond is created without enslaved links and, when the card is installed, the links are enslaved to the system bond. In a single appliance cluster, the system bond exists although the intra-appliance clustering is routed to the interconnect ports between the storage processors and not transferred over the system bond.

In some situations, the clustering network is a native only network. Along these lines, there is no VLAN configured, and the ICM, ICD and NAS management traffic is untagged. Additionally, IP addresses are auto generated using the IPv6 Unique Local Addresses (ULA). Furthermore, there is no re-configurability in that no changes can be made to MTU, native VLAN, or IPv6 addresses of the clustering network. Also, intra-appliance traffic is internally routed via interconnect links between the storage processors (e.g., the clustering network cabling to the ToR switch is not required for a single appliance configuration.

In a particular conventional implementation, a default configuration of network devices which is created by default on each storage processor in each appliance is predefined and cannot be deleted or modified. Along these lines, a system bond (e.g., bond0) is a LACP LAG created on top of the first two ports on an OCP Mezz card. The LACP bond is used for HA reasons of clustering network physical connectivity. The ICM, ICD and SDNAS management networks are created on top of bond0.

In accordance with certain embodiments, storage nodes include several OCP slots that enable a user to add NICs as desired. There is no requirement or mandate to purchase certain cards or use certain ports for clustering network connectivity. Accordingly, the need to create a system bond by default on a default card is eliminated. Instead, the user is able to configure a bond and enable the ICM/ICD to consume it. In addition, the ICM/ICD is customer configurable upon scale out (e.g., part of an "Add Appliance" procedure). This enables a flexible, user-centric model for clustering going forward.

In some embodiments, there is a hardware-agnostic architecture that can support any hardware platform and any federated storage array. In such embodiments, there is decoupling of the clustering network from specific cards or ports, ultimately removing all current restrictions and prerequisites.

In accordance with certain embodiments, there is a new infrastructure for an internal network for clustered and federated storage systems, referred as an internal clustering network used for internal cluster management (ICM) and internal cluster data (ICD). Such improvements are based on de-coupling of the internal clustering network (L3) from physical interfaces (L2) and not mandating existence of a specific IO card to be used for the clustering network. Advantageously, this provides flexibility to the user to decide which cards/ports to use for the internal clustering network.

In some situations, the clustering network is user flexible and platform agnostic with the following features:

- no default card/ports for physical clustering connectivity.
- a system bond will not be created by default (and it is also possible to use single Ethernet port, while a bond is being used for HA purposes only).
- the clustering network is be user configurable (e.g., the user may opt to configure VLAN or use untagged traffic, the user may opt to configure bond on any interfaces on the installed IO cards and associate the clustering network with it, etc.).
- the clustering network configuration (VLAN) and its association to user configurable bond may be provided upon scale out, as a part of "Add Appliance" procedure.

In accordance with certain embodiments, in the case of a single appliance cluster, it is not required to connect the clustering network externally, as the traffic is routed internally. These embodiments eliminate the need to create the external connectivity device (e.g., the system bond) by default during the installation of a single appliance.

In accordance with certain embodiments, the created internal clustering network device is referred as a clustering bond. The 'clustering bond' device functions as a root device to keep all north bound L3 infrastructure in place with no changes. No physical FE Ethernet ports are connected to the 'clustering bond' at installation time of the single appliance cluster, as intra-appliance communication for single appliance may keep working with routing through the interconnect ports. Additionally, this supports deployment of a single appliance when physical external connectivity is not required.

Additionally, the procedure to deploy multi-appliance may involve a create cluster operation of a single appliance. After this operation, the Add Appliance (or Appliances) procedure may be performed.

The clustering Network is mapped to a user configurable bond device on the desired IO Card and FE ports selected by the user. Such occurs independently on each appliance.

During installation of a single appliance, the following takes place:

- the clustering network is associated with the internal 'clustering bond'.
- the 'clustering bond' is not visible externally.
- the 'clustering bond' is used to keep the upper network infrastructure (icm0, icd0, eth_mgmt) as is.
- the 'clustering bond' is not connected to physical interfaces (FE ports).

During scale out to a multi applicance configuration, the association of the clustering network with physical interfaces may be done by the user when it is needed (e.g. upon scale out, as a part of Add Appliance procedure). In this situation, the user will be asked to follow a few additional steps to configure the clustering network and associate it with physical interfaces:

- VLAN configuration (optional)
- Map clustering network to user configurable bond:
  - for an existing appliance in the configured state (this step is needed for single appliance cluster only), the user may choose an already configured bond or configure new bond.
  - for added appliance in unconfigured state, the user selects FE ports to be aggregated in a LACP bond.

In some embodiments, there is a networking devices structure after the Add Appliance procedure. Here, the 'clustering bond' is connected to a user configurable bond, e.g., bondX (also see FIG. 4).

Such embodiments provide the following features:

- Connecting the clustering bond to the external bond (bondX) is done by "enslaving" the clustering network connection device into the bond. This operation is conceptually different from the usual "create net device on top of another net device" one. Also, when enslaving in or releasing a clustering network connection device from the clustering bond, there is no need to delete and reconstruct the clustering bond child devices and IPs. The devices and the IPs on top of the clustering bond remain intact, while seamlessly switching between different external connection bonds and VLANs.
- The ability to move the whole hierarchy tree, together with the devices in multiple containers can be done (e.g., in Linux) with the help of two device types: the LAG (bond) and the L2 bridge forming devices (bridge). Both device types allow changing their connectivity below w/o touching the device and IPs tree above. In some arrangements, a bond device (clustering bond) may be used to minimize changes to an existing code base.
- This solution enables switching of the clustering network non-disruptively to different ports and to different VLANs, or completely disconnecting it from the external network infrastructure.

In accordance with certain embodiments, there are the following features:

- de-coupling of the clustering network from a specific hardware platform thus providing generic solution that can be leveraged to other federated storage arrays.
- no mandating purchase a certain default IO card and preconfigured interface (bond) at installation time.
- utilization of a clustering bond and enslaving the external user defined bond to keep the entire net devices tree and IPs on top of it—this enables keeping existing infrastructure of the clustering network.
- seamless scale out to multi appliance cluster, the physical FE ports attached at the south bound to clustering bond.
- enablement of switching the clustering network non-disruptively to different port and to different VLANs.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of operating a storage cluster, the method comprising:

providing the storage cluster initially as a single appliance cluster which has a first storage appliance including storage nodes;

creating clustering devices on the storage nodes of the first storage appliance, the clustering devices being constructed and arranged to form at least a portion of a clustering network to convey, internal to the storage cluster, cluster-related communications including control plane communications, and the clustering devices being without bonded physical interfaces at least initially; and while the clustering devices are without bonded physical interfaces, running the storage nodes of the first storage appliance to perform storage operations on behalf of a set of hosts, wherein running the storage nodes of the first storage appliance includes conveying clustering network traffic, including the cluster-related communications, between the storage nodes of the first storage appliance to support clustering services running on the storage nodes of the first storage appliance.

2. The method of claim 1 wherein creating the clustering devices on the storage nodes of the first storage appliance includes:

creating the clustering devices as link aggregation groups, the created clustering devices having no enslaved physical interfaces.

3. The method of claim 2 wherein running the storage nodes of the first storage appliance to perform the storage operations on behalf of the set of hosts occurs while the created clustering devices have no enslaved physical interfaces.

4. The method of claim 3, further comprising:

installing network cards onto the storage nodes of the first storage appliance, the network cards having physical interfaces, creating user bond devices which enslave the physical interfaces of network cards, and coupling the user bond devices with the clustering devices.

5. The method of claim 4 wherein the network cards are hardware-agnostic network interface cards (NICs); and wherein coupling the user bond devices with the cluster bond devices includes:

enslaving the user bond devices with the cluster bond devices.

6. The method of claim 4, further comprising:

conveying host communications to and from the set of hosts through the physical interfaces of the network cards.

7. The method of claim 4, further comprising:

establishing connections between the first storage appliance and a second storage appliance through the clustering devices, the user bond devices, and the physical interfaces of the network cards to form a multi-appliance cluster in place of the single appliance cluster.

8. The method of claim 1 wherein the first storage appliance further includes an interconnect; and wherein conveying the clustering network traffic between the storage nodes of the first storage appliance includes:

exchanging intra-appliance communications through the interconnect.

9. The method of claim 1 wherein conveying the clustering network traffic between the storage nodes of the first storage appliance occurs while the first storage appliance does not include any network cards and while there are no physical Ethernet ports connected to the clustering devices.

10. Data storage equipment, comprising:

memory; and control circuitry coupled with the memory, the memory storing instructions which, when carried out by the control circuitry, cause the control circuitry to perform a method of:

configuring the memory and the control circuitry to provide a single appliance cluster which has a first storage appliance including storage nodes, creating clustering devices on the storage nodes of the first storage appliance, the clustering devices being constructed and arranged to form at least a portion of a clustering network to convey, internal to the storage cluster, cluster-related communications including control plane communications, and the clustering devices being without bonded physical interfaces at least initially, and while the clustering devices are without bonded physical interfaces, running the storage nodes of the first storage appliance to perform storage operations on behalf of a set of hosts, wherein running the storage nodes of the first storage appliance includes conveying clustering network traffic, including the cluster-related communications, between the storage nodes of the first storage appliance to support clustering services running on the storage nodes of the first storage appliance.

11. Data storage equipment as in claim 10 wherein creating the clustering devices on the storage nodes of the first storage appliance includes:

creating the clustering devices as link aggregation groups, the created clustering devices having no enslaved physical interfaces.

12. Data storage equipment as in claim 11 wherein running the storage nodes of the first storage appliance to perform the storage operations on behalf of the set of hosts occurs while the created clustering devices have no enslaved physical interfaces.

13. Data storage equipment as in claim 12, further comprising:

installing network cards onto the storage nodes of the first storage appliance, the network cards having physical interfaces, creating user bond devices which enslave the physical interfaces of network cards, and coupling the user bond devices with the clustering devices.

14. Data storage equipment as in claim 13 wherein the network cards are hardware-agnostic network interface cards (NICs); and wherein coupling the user bond devices with the cluster bond devices includes:

enslaving the user bond devices with the cluster bond devices.

15. Data storage equipment as in claim 13, further comprising:

establishing connections between the first storage appliance and a second storage appliance through the clustering devices, the user bond devices, and the physical interfaces of the network cards to form a multi-appliance cluster in place of the single appliance cluster.

16. Data storage equipment as in claim 10 wherein the first storage appliance further includes an interconnect; and wherein conveying the clustering network traffic between the storage nodes of the first storage appliance includes: exchanging intra-appliance communications through the interconnect.

17. Data storage equipment as in claim 10 wherein conveying the clustering network traffic between the storage nodes of the first storage appliance occurs while the first storage appliance does not include any network cards and while there are no physical Ethernet ports connected to the clustering devices.

18. A computer program product having a non-transitory computer readable medium which stores a set of instructions to operate a storage cluster, the set of instructions, when carried out by computerized circuitry, causing the computerized circuitry to perform a method of:

configuring the computerized circuitry to provide a single appliance cluster which has a first storage appliance including storage nodes;

creating clustering devices on the storage nodes of the first storage appliance, the clustering devices being constructed and arranged to form at least a portion of a clustering network to convey, internal to the storage cluster, cluster-related communications including control plane communications, and the clustering devices being without bonded physical interfaces at least initially; and while the clustering devices are without bonded physical interfaces, running the storage nodes of the first storage appliance to perform storage operations on behalf of a set of hosts, wherein running the storage nodes of the first storage appliance includes conveying clustering network traffic, including the cluster-related communications, between the storage nodes of the first storage appliance to support clustering services running on the storage nodes of the first storage appliance.

* * * * *